Patented Apr. 29, 1930

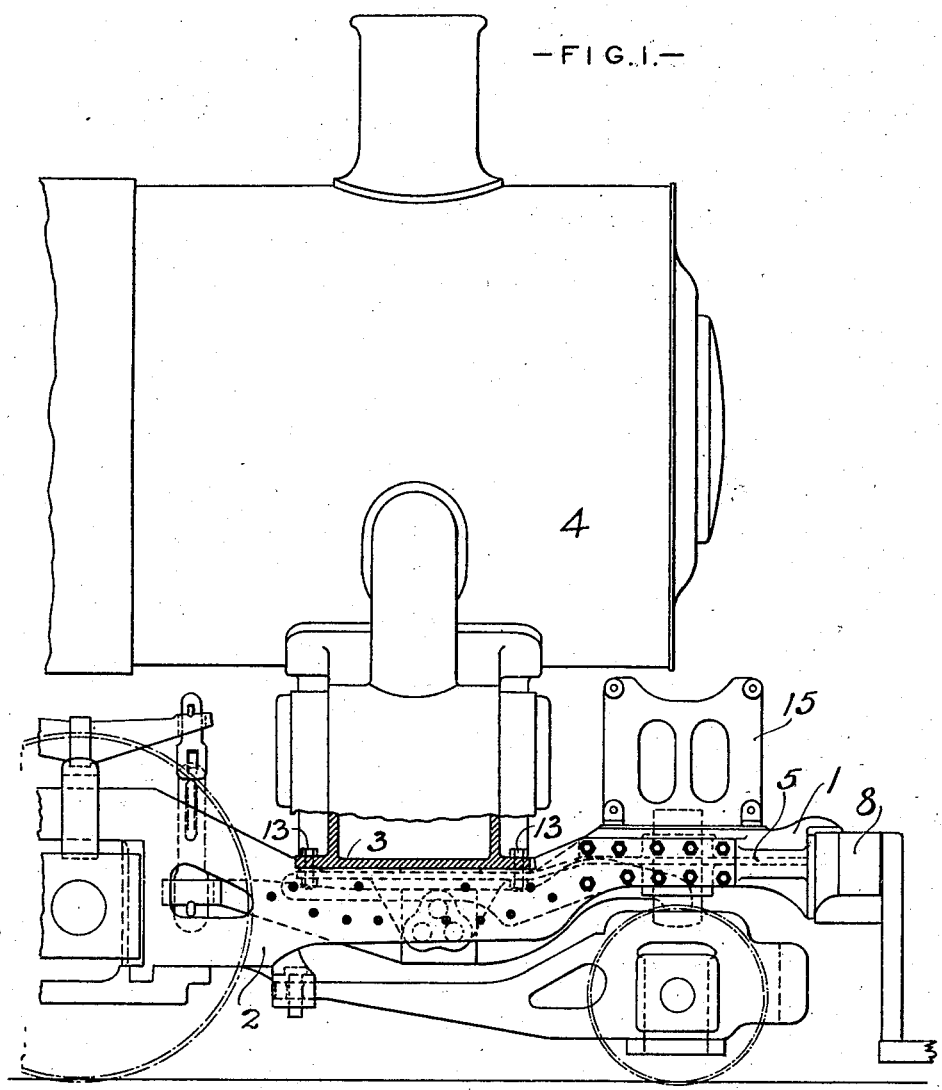

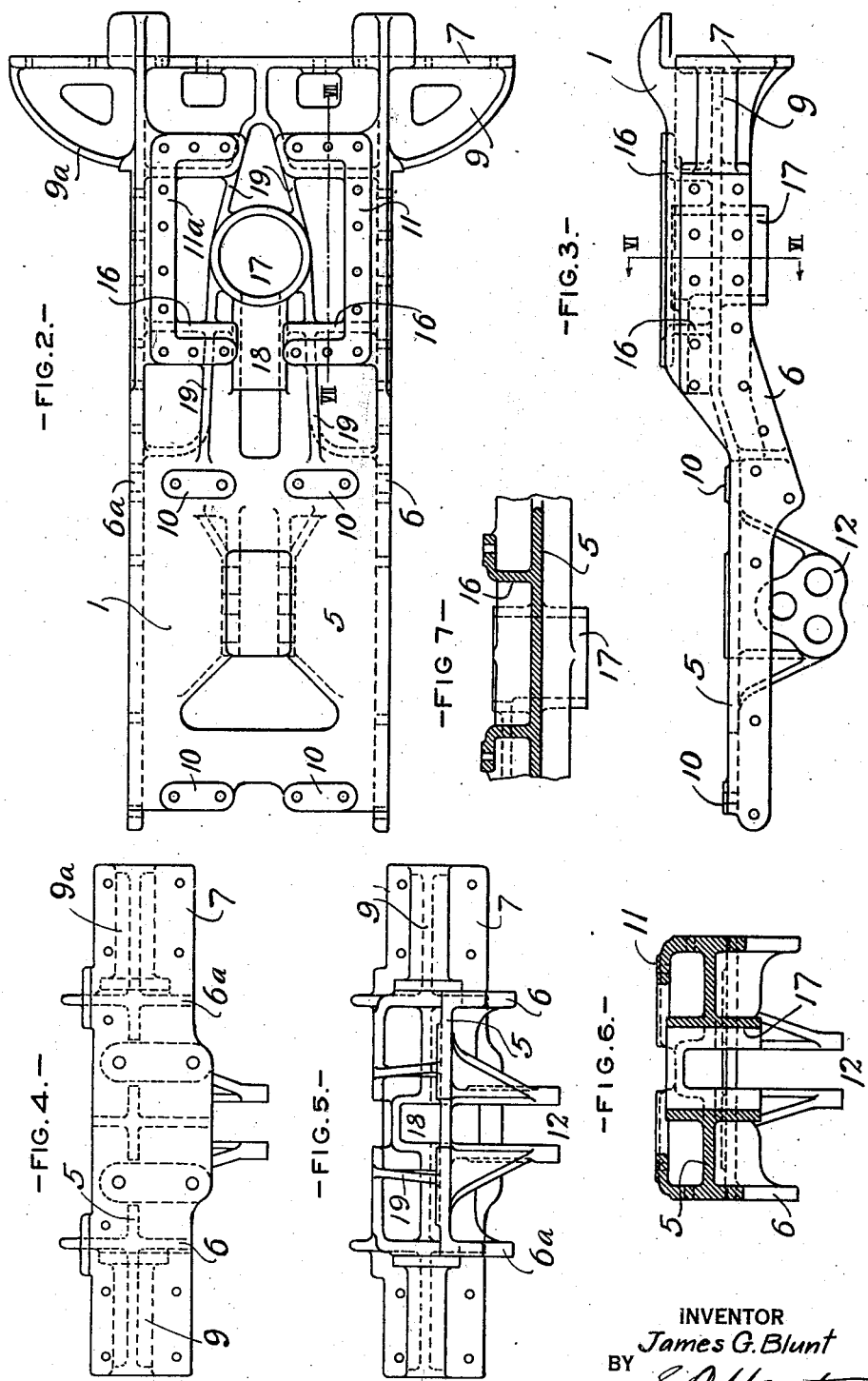

1,756,480

UNITED STATES PATENT OFFICE

JAMES G. BLUNT, OF SCHENECTADY, NEW YORK

LOCOMOTIVE BUMPER BRACKET

Application filed May 20, 1929. Serial No. 364,493.

This invention relates, generally, to the structure of locomotive engines, and particularly to means for simplifying and strengthening the construction of the front ends thereof.

The object of the invention is to provide means whereby the bumper bracket, the side frame members, the cylinder saddle, and the engine truck equalizer fulcrum may be more firmly secured and incorporated in the structure.

The improvement claimed is hereinafter fully set forth.

In the accompanying drawings: Figure 1, is a side view in elevation and partially in section, of the forward portion of a locomotive engine; Fig. 2, a plan view of the bumper bracket and associated parts; Fig. 3, a side view in elevation of the bracket shown in Fig. 1; Fig. 4, a front view, in elevation of Fig. 2; Fig. 5, a rear view, in elevation, of Fig. 2; Fig. 6, a view in section on the line VI—VI of Fig. 3; and, Fig. 7, a partial section in elevation, on the line VII—VII of Fig. 2.

In the practice of the invention, referring descriptively to the specific embodiment thereof which is herein exemplified, a bumper bracket 1, is mounted between a pair of side frame member 2, on which are mounted a cylinder saddle 3, which supports the usual boiler 4.

The bumper bracket, 1, is formed as an integral casting adapted to be interposed between the frames, 2, and to extend rearwardly approximately in line with the rear of the cylinder saddle, 3. Said bracket may be of any suitable box or other section, but is preferably constructed as comprising a horizontal web, 5, joining the vertical side flanges, 6, 6ª, adapted to be secured to the side frames, 2; a front transverse vertical flange, 7, adapted to have mounted upon it the bumper beam, 8, although the bumper beam may be made a part of the casting, if desired; suitable brackets, 9, 9ª, connecting the vertical flange, 7, to the side flanges, 6, 6ª; and on the rearwardly extending portion is formed the equalizer fulcrum bracket, 12, same being integrally formed therewith or separately attached thereto, if desired.

On the upper face of the web, 5, are formed the seatings, 10, adapted to abut against and to be secured to the under side of the cylinder saddle, 3, by means of the bolts, 13, and the seatings, 11, 11ª, adapted to have mounted on them the air-pump brackets, 15, these latter seatings being raised above the surface of the web, 5, by the vertical flanges, 16, if required, although these brackets may be formed integrally with the bumper bracket. A tubular member, 17, is formed with the web, 5, to provide a guide for an engine truck centre pin, and is braced thereto by suitable braces, 19, 19, and a hollow box shaped member, 18, is joined to the tubular member, 17, and the web, 5, to form a housing for an engine truck equalizer, or, if desired, other means may be employed for taking up the lateral resistance of the truck instead of the member, 17, as for instance that shown in my Patent No. 1,699,603.

Engine truck equalizer fulcrums are usually connected to the cylinder saddle by bolts or studs, which are often inaccessible, resulting in insecure connections. In the present invention, the bumper bracket, integral with which is formed the said fulcrum, is secured, not only to the cylinder saddle, but also to the frame members, thereby simplifying and strengthening the structure.

The invention claimed and desired to be secured by Letters Patent is:

1. In a locomotive structure, the combination of a cylinder saddle; two side frame members, extending integrally from the front pedestals to the front of the cylinder saddle; a bumper beam; a bumper bracket, having a rearward extension interposed between and secured to the side frame members; and an engine truck equalizer fulcrum depending from said bracket.

2. In a locomotive structure, the combination of a cylinder saddle; two side frame members, extending integrally from the front pedestals to the front of the cylinder saddle; a bumper beam; and a bumper bracket, comprising a rearward extension interposed between and secured to the side frame members, a transverse flange for securing the bumper beam thereto, and an engine truck equalizer fulcrum.

3. In a locomotive structure, the combination of a cylinder saddle; two side frame members, extending integrally from the front pedestals to the front of the cylinder saddle; a bumper beam; and a bumper bracket, comprising a rearward extension interposed between and secured to the said side frames.

4. A bumper bracket for locomotives, comprising, in an integral casting, a main body structure, having vertical lateral flanges; a rearwardly flanged extension, adapted to abut vertically against side frame members, and horizontally against a cylinder saddle; and means for taking up the lateral resistance of the truck.

5. A bumper bracket for locomotives, comprising, in an integral casting, a main body member, having vertical lateral flanges, and a transversely extending vertical flange on its forward end for connection to a bumper beam; a rearwardly downwardly flanged extension, adapted to abut vertically against side frame members, and horizontally against a cylinder saddle; an opening to guide an engine truck centre pin; and an engine truck equalizer fulcrum.

6. A bumper bracket for locomotives, comprising, in an integral casting, a main body structure, having vertical lateral flanges, and a transversely extending vertical flange on its forward end, for connection to a bumper beam; a rearwardly downwardly flanged extension, adapted to abut vertically against side frame members, and horizontally against a cylinder saddle; an opening to guide an engine truck centre pin; a downwardly depending engine truck equalizer fulcrum; and upwardly extending air pump brackets.

7. An integral casting for locomotives, comprising a main body member, and vertical lateral bolting flanges adapted to be bolted between and to the side frames of the locomotive, and to extend from the forward end thereof to the rear of the cylinder saddle, said casting being provided with means adapted for attachment to said cylinder saddle.

JAMES G. BLUNT.